UNITED STATES PATENT OFFICE.

HENRY L. STAFFORD, OF LONG BEACH, CALIFORNIA.

FOOD PRODUCT AND PROCESS OF PREPARING THE SAME.

1,143,087.　　　　　Specification of Letters Patent.　　Patented June 15, 1915.

No Drawing.　　Application filed August 19, 1914.　Serial No. 857,526.

*To all whom it may concern:*

Be it known that I, HENRY L. STAFFORD, a citizen of the United States, residing at Long Beach, in the county of Los Angeles and State of California, have invented a new and useful Food Product and Process of Preparing the Same, of which the following is a specification.

In preparing tuna fish heretofore only the white meat has been utilized, the dark meat and fat parts and bellies and other edible parts are thrown away. It is this portion of the fish which is thrown away which I utilize for my new food product.

In preparing my food product I first steam or cook the fish and the white meat is picked out. The dark meat, fat parts and bellies and other edible parts exclusive of the bones, I then grind. This ground meat does not contain sufficient oil and juice and I take other dark meat and fat parts, bellies and other edible parts and subject it to pressure to squeeze the fish oil and juice therefrom and take this fish oil and juice and add it to the ground meat mixing it therewith and imparting the necessary additional flavor and juice. I also add spices for example as follows: dried red pepper, white pepper, cayenne pepper, dried yellow pepper, Hungarian paprika, cinnamon, cloves, mace, corriander, East Indian curry, marjoram, bay leaves, rosemary. I also mix in the necessary amount of salt and a sufficient amount of the expressed juice is added to make the patty in a moist state suitable for sandwiches. The fish prepared in this way is packed in tins and boxes in the usual way and the product is extremely palatable and nutritious.

What I claim is:

1. A food product comprising edible waste portions exclusive of the bones of the fish which have been ground and combined with fish oil and juice expressed from other similar waste portions of the fish with suitable seasoning.

2. The process of producing potted tuna, which consists of steaming the fish, then grinding the dark meat and fat parts, also subjecting other dark meat and fat parts to pressure to extract the fish oil and juice therefrom, then adding this fish oil and juice to the ground parts and adding suitable seasoning.

3. The process of producing an edible fish product, which consists of steaming or cooking the fish, grinding a portion of the fish meat, subjecting other fish parts to pressure to extract the fish oil and juice therefrom, then adding the fish oil and juice to the first ground parts and adding suitable seasoning.

4. The process of producing an edible fish product, which consists of steaming the fish, grinding the fish meat and then adding fish oil and suitable seasoning to the ground parts.

5. A food product comprising edible waste portions of fish which have been ground and combined with fish oil and juice and suitable seasoning.

6. The process of producing an edible fish product which consists of steaming or cooking the fish, subjecting fish to pressure to extract the fish oil and juice therefrom then adding the fish oil and juice to the steamed or cooked fish, and suitable seasoning.

In testimony whereof, I have hereunto set my hand at Los Angeles, California, this 11 day of August, 1914.

HENRY L. STAFFORD.

In presence of—
　G. T. HACKLEY,
　LORRAINE E. DURROW.